United States Patent [19]
Kirkpatrick

[11] Patent Number: 5,257,156

[45] Date of Patent: Oct. 26, 1993

[54] TURN-ON TRANSIENT OVERCURRENT RESPONSE SUPPRESSOR

[75] Inventor: Thomas I. Kirkpatrick, La Jolla, Calif.

[73] Assignee: The United States of America as represented by the Secretary of the Navy, Washington, D.C.

[21] Appl. No.: 855,362

[22] Filed: Mar. 18, 1992

[51] Int. Cl.$^5$ ................. H02H 3/06; H02H 3/093
[52] U.S. Cl. ..................... 361/18; 361/111; 323/277; 323/901; 323/908
[58] Field of Search ............. 361/18, 83, 86, 87, 361/89, 94, 110, 111; 323/908, 277, 273, 279

[56] References Cited

U.S. PATENT DOCUMENTS

| | | | |
|---|---|---|---|
| 3,444,481 | 5/1969 | Fisher | 331/113 |
| 4,016,461 | 4/1977 | Roland | 361/18 |
| 4,351,021 | 9/1982 | Morihisa et al. | 363/49 |
| 4,574,232 | 3/1986 | Petty | 323/268 |
| 4,642,746 | 2/1987 | Lösel | 363/49 |
| 4,740,742 | 4/1988 | Gontowski, Jr. | 323/313 |

*Primary Examiner*—A. D. Pellinen
*Assistant Examiner*—Ronald W. Leja
*Attorney, Agent, or Firm*—Harvey Fendelman; Thomas Glenn Keough

[57] ABSTRACT

A turn-on transient overcurrent response suppressor is connected to an existing electrical circuit having a regulator circuit that includes an overcurrent protection mechanism. A first charging circuit is connected to the power supply for simultaneous charging therewith. A second charging circuit is connected to the first charging circuit for delayed charging therewith. Connected between the first and second charging circuits is a circuit to create a low impedance discharge path for the second charging circuit while preventing discharge of the first charging circuit when the power supply is no longer providing the input voltage. First and second transistor circuits are connected to turn on during the charging and discharging of the second charging circuit and turn off when the second charging circuit is fully charged. In this way, turn-on transients caused by loss of AC power are prevented from falsely triggering the regulator circuit's overcurrent protection mechanism. The suppressor is particularly useful when a driven load is an active device.

8 Claims, 1 Drawing Sheet

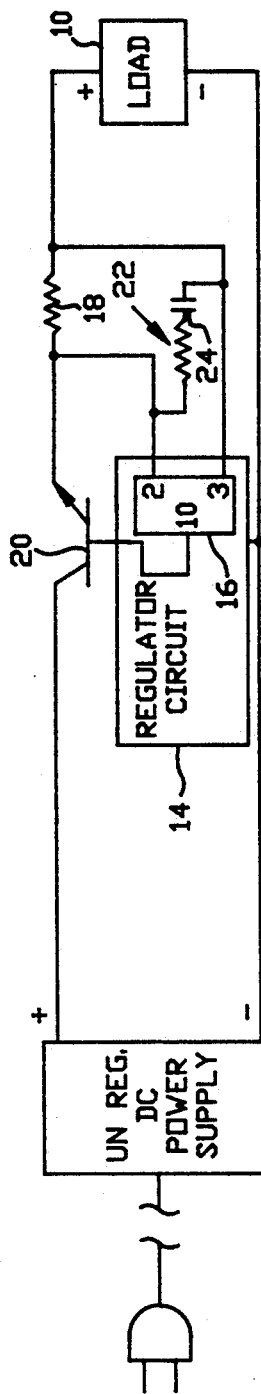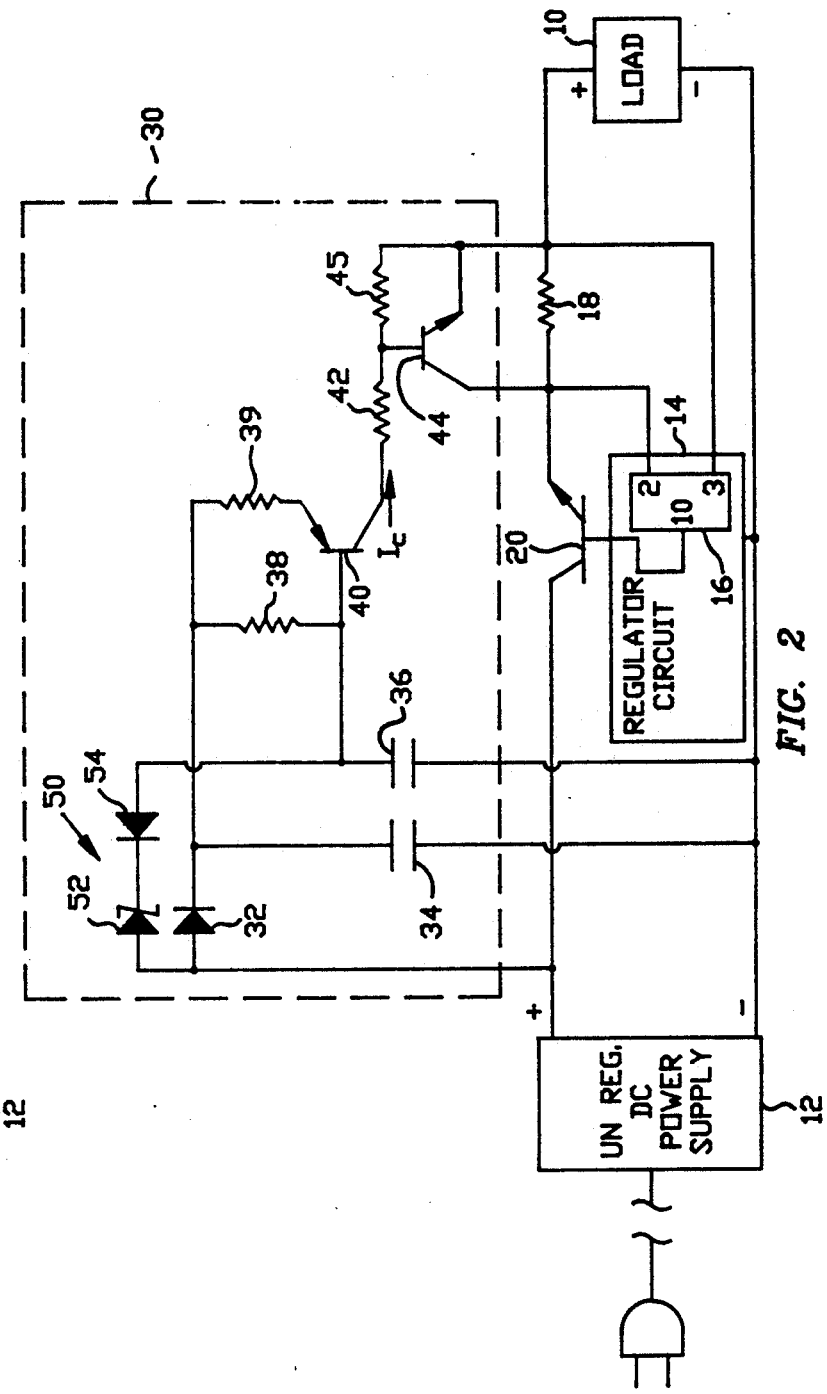

TURN-ON TRANSIENT OVERCURRENT RESPONSE SUPPRESSOR

STATEMENT OF GOVERNMENT INTEREST

The invention described herein may be manufactured and used by or for the Government of the United States for governmental purposes without the payment of any royalties thereon or therefor.

FIELD OF THE INVENTION

The present invention relates to the field of overcurrent suppression circuits, and more particularly to an overcurrent response suppressor circuit for preventing a "turn-on" developed transient overcurrent from unnecessarily interrupting power being supplied to a driven load and permanently locking a regulated power supply in a low voltage "folded back" state.

BACKGROUND OF THE INVENTION

Linear regulated power supplies typically include one of many commercially available integrated circuits as the heart of a regulator control loop. The integrated circuit generally includes a built-in overcurrent protection/limiting capability to protect the power supply from damage in the case of overcurrent situations. One such commonly used integrated circuit is the industry standard 723C chip manufactured by, among others, National Semiconductor. Overcurrent protection operation of the 723C will be explained briefly in conjunction with the circuit of FIG. 1.

In FIG. 1, a load 10 is supplied with electrical power from an unregulated (AC driven) DC power supply 12. Interposed between load 10 and power supply 12 is a regulator circuit 14 that includes (for example) a 723C chip 16. Only connections to pin numbers 2, 3 and 10 of chip 16 pertain to overcurrent protection. Accordingly, only these pins are shown and discussed hereinbelow. A low value, current sensing resistor 18 is placed in series with load 10. Voltage developed across sensing resistor 18 is applied to pin numbers 2 and 3 of chip 16. If this voltage exceeds an internally set threshold value, the 723C chip 16 reacts by shutting down the base drive (from pin 10 of the 723C chip) to a pass transistor 20 thereby lowering the output voltage applied to the positive terminal of load 10 to a safe level.

If load 10 is primarily resistive, current is proportional to voltage and there is no problem with a "turn-on" transient. However, active devices such as operational amplifiers can exhibit highly nonlinear supply current characteristics at a very low (under 2 volts) supply voltages. Naturally, low supply voltage occurs on a transient basis each time power is turned on and the power supply's output voltage rises from zero. During the initial stage of this transient, an active device can draw considerably more current than it does at the correct operating voltage. Accordingly, the 723C chip 16 shuts down the output to load 10 when an overcurrent condition is sensed through sensing resistor 18. Unfortunately, without further circuitry, the output to load 10 remains in a locked-down state which is the equivalent of outputting only a few tenths of a volt.

To alleviate this problem, a series RC network 22 is typically placed between pins 2 and 3 of the 723C chip 16. Upon initial turn-on, the voltage between pins 2 and 3 is prevented from exceeding the internally set threshold value for a short interval while capacitor 24 charges. While this works satisfactorily for the initial power-on transient, it does not prevent the locked-down state from occurring in cases of momentary AC line power dropouts. Specifically, if AC line power returns before capacitor 24 has discharged, it is possible for the resultant voltage produced by the momentary overcurrent through sensing resistor 18 to be applied unattenuated across pins 2 and 3 of the 723C chip 16 thereby triggering a shutdown.

Thus, a need exists for suppressing turn-on transients for active device loads for both the initial turn-on transient and any subsequent turn-on transients caused by momentary AC power dropouts. Accordingly, an object of the present invention is to provide a turn-on transient overcurrent response suppressor for use with existing overcurrent protection circuits to prevent false triggering of the protection circuits in the event of initial or subsequent turn-on transient overcurrent conditions. Another object of the present invention is to provide a turn-on transient overcurrent response suppressor for use with existing overcurrent protection circuits to prevent the creation of a locked-down state by the existing protection circuit.

SUMMARY OF THE INVENTION

An electrical circuit that includes a DC power supply provides an input voltage to a serially connected load. A regulator circuit may be connected between the power supply and load to interrupt the supply of power to the load in the event of an overcurrent condition. Typically, the regulator circuit includes a current sensing resistor for sensing the overcurrent condition. In accordance with the present invention, a turn-on transient overcurrent response suppressor is provided. A first charging circuit is connected to the power supply for simultaneous charging therewith. A second charging circuit is connected to the first charging circuit for delayed charging therewith. Connected between the first and second charging circuits is a means to create a low impedance discharge path for the second charging circuit while preventing discharge of the first charging circuit when the power supply is no longer providing the input voltage. A first transistor circuit has its base-emitter junction connected to the second charging circuit. A second transistor circuit has its base-emitter junction connected to a collector of the first transistor circuit. The second transistor circuit further has its collector and emitter connected across the current sensing resistor. In this way, the first and second transistor circuits are turned on during the charging and discharging of the second charging circuit and turned off when the second charging circuit is fully charged.

DESCRIPTION OF THE DRAWINGS

FIG. 1 is a schematic diagram of a circuit structure that includes a prior art overcurrent protection arrangement; and FIG. 2 is a circuit diagram of a turn-on transient overcurrent response suppressor according to the present invention connected to supplement an existing prior art overcurrent protection arrangement.

DESCRIPTION OF THE PREFERRED EMBODIMENT

Referring now to the drawings, and in particular to FIG. 2, a circuit diagram of a turn-on transient overcurrent response suppressor according to the present invention is shown and contained generally within dotted line box 30. Suppressor 30 is shown connected to a typical existing overcurrent protection arrangement as described above in conjunction with FIG. 1. Accordingly, like reference numerals are used for common elements. Suppressor 30 is shown and will be described with respect to its connection to the positive side of power supply 12. However, it is to be understood that another suppressor could be connected to a negative power supply since it is common practice to construct a mirror image of the positive power supply 12 and its associated regulator elements. The structure and function of such a second suppressor would be similar to that about to be described for suppressor 30.

For ease of understanding, the structure and function of suppressor 30 will be described simultaneously. When power supply 12 is turned on, a raw DC input voltage begins to ramp up from zero thereby causing diode 32 to forward bias and charge a first capacitor 34. As capacitor 34 charges, a second capacitor 36 charges through resistor 38 and the base of a first transistor 40. The time constant associated with capacitor 36 and its charging path is chosen so that its voltage lags capacitor 34 by several volts during the period of rising voltage. This ensures that the upper ends of resistors 38 and 39 will be at a greater positive potential than the base of transistor 40. Thus, transistor 40 is turned on during the period of rising voltage.

As capacitor 36 charges, the base-emitter junction of transistor 40 connected across resistor 38 is forward biased to allow collector current $I_c$ to flow therefrom through resistor 42. Resistor 39 acts as a current limiting device which allows the base of transistor 40 to be held at the voltage of capacitor 36 without drawing excessive base current. Collector current $I_c$ saturates a second transistor 44 to prevent any overcurrent from flowing through current sensing resistor 18. Therefore, during a turn-on overcurrent condition, current sensing resistor 18 is prevented from generating a voltage across pins 2 and 3 of 723C chip 16 sufficient to trigger a shutdown.

Eventually, capacitor 36 will charge to the point that resistor 38 and the base of transistor 40 will not be required to supply much charging current. At this point, transistor 40 will turn off due to the action of its base-emitter resistor 39 and collector current $I_c$ will cease. When $I_c$ ceases, transistor 44 will also turn off due to the action of its base-emitter resistor 45. As viewed by pins 2 and 3 of 723C chip 16, transistor 44 appears as a low impedance when it is turned on, and as a high impedance when it is turned off. By the time the input voltage from power supply 12 has risen sufficiently to allow regulator 14 and pass transistor 20 to be active (i.e. produce adequate output voltage for load 10 to be out of its nonlinear operating condition), transistor 44 is turned off and thus appears as a high impedance. At this point, current sensing resistor 18 is active in terms of overcurrent protection.

Connected to the input voltage and between capacitor 36 and resistor 38 is a series connected diode combination 50. Diode combination 50 includes a Zener diode 52 and biasing diode 54. The base of Zener diode 52 is connected to receive the input voltage while the base of biasing diode 54 is connected between capacitor 36 and resistor 38. In this way, if the raw DC input voltage from power supply 12 drops rapidly due to an AC power line dropout, diode combination 50 creates a low impedance discharge path. Capacitor 36 will rapidly discharge through diode combination 50 and track along with the drop in raw DC input voltage. The presence of Zener diode 52 delays the discharge of capacitor 36 just long enough so that very small disturbances in the raw DC input voltage can be ignored.

As capacitor 36 discharges, diode 32 reverse biases so that capacitor 34 remains charged. This in turn allows a base-emitter voltage to reappear at transistor 40 thereby allowing it to again conduct. Since capacitor 36 is allowed to discharge quickly as the raw DC input voltage is falling, the afore-described turn-on transient suppression action is again available as soon as the input voltage is restored to normal.

The advantages of the present invention are numerous. The false triggering of an existing regulator circuit's overcurrent protection mechanism is prevented for both initial and subsequent turn-on transient conditions. Thus, only true overcurrent conditions will result in triggering the overcurrent protection mechanism. The present invention is easily adapted to a wide variety of overcurrent protection circuits. Choice of circuit components and their values may be adjusted to satisfy transient characteristics of the particular (active device) load.

By way of example only, a list of components/values is given in the following Component Table when load 10 is an operational amplifier and power supply 12 is capable of delivering 24 volts DC.

| Component Table | |
|---|---|
| Diode 32 | IN914 |
| Capacitor 34 | 10 μF |
| Capacitor 36 | 1 μF |
| Resistor 38 | 12K ohms |
| Resistor 39 | 560 ohms |
| Transistor 40 | 2N3906 |
| Resistor 42 | 12K ohms |
| Transistor 44 | 2N2222 |
| Resistor 45 | 12K ohms |
| Zener diode 52 | IN753A |
| Diode 54 | IN914 |

It will be readily apparent to those skilled in the art that the components/values given herein may be scaled up or down, as long as relative impedances between components remain unchanged.

Although the invention has been described relative to a specific embodiment thereof, there are numerous variations and modifications that will be readily apparent to those skilled in the art in the light of the above teachings. It is therefore to be understood that, within the scope of the appended claims, the invention may be practiced other than as specifically described.

What is claimed as new and desired to be secured by Letters Patent of the United State is:

1. A turn-on transient overcurrent response suppressor comprising:
   a first charging circuit connected to a DC power supply for simultaneous charging therewith, the power supply providing an input voltage to a serially connected load, wherein a regulator circuit is connected between the power supply and load for interrupting the supply of power to the load in the event of an overcurrent condition, the regulator circuit including a current sensing resistor for sensing the overcurrent condition;
   a second charging circuit connected to said first charging circuit for delayed charging therewith;
   means, connected between said first and second charging circuits for providing a low impedance discharge path for said second charging circuit while preventing discharge of said first charging circuit when the power supply is no longer providing the input voltage;

a first transistor circuit having a base-emitter junction connected to said second charging circuit; and a second transistor circuit having a base-emitter junction connected to a collector of said first transistor circuit, said second transistor circuit further having a collector and emitter connected across the current sensing resistor whereby said first and second transistor circuits are turned on during the charging and discharging of said second charging circuit and turned off when said second charging circuit is fully charged.

2. A turn-on transient overcurrent response suppressor as in claim 1, wherein said first charging circuit comprises:

a first biasing diode connected to receive the input voltage; and a first capacitor connected in series with said biasing diode wherein said first capacitor charges when said first biasing diode is forward biased.

3. A turn-on transient overcurrent response suppressor as in claim 1, wherein said second charging circuit is connected in parallel with said first charging circuit and further comprises an RC network.

4. A turn-on transient overcurrent response suppressor as in claim 3, wherein said means for providing a low impedance discharge path comprises:

a Zener diode connected to receive the input voltage; and a discharge diode in series connection with said Zener diode and further connected between the resistor and capacitor of said RC network, wherein said discharge diode forward biases to allow the capacitor of said RC network to discharge through said discharge diode and said Zener diode when the input voltage drops.

5. A turn-on transient overcurrent response suppressor as in claim 3, wherein the base-emitter junction of said first transistor circuit is connected across the resistor of said RC network.

6. A turn-on transient overcurrent response suppressor comprising:

a first charging circuit connected to a DC power supply for simultaneous charging therewith, the power supply providing an input voltage to a serially connected load, wherein a regulator circuit is connected between the power supply and load for interrupting the supply of power to the load in the event of an overcurrent condition, the regulator circuit including a current sensing resistor for sensing the overcurrent condition;

a second charging circuit connected to said first charging circuit for delayed charging therewith; and means connected between said first and second charging circuits and the current sensing resistor, for inhibiting current flow through the current sensing resistor while said second charging circuit is charging and for permitting current flow through the current sensing resistor when said second charging circuit is fully charged.

7. A turn-on transient overcurrent response suppressor as in claim 6, wherein said first charging circuit comprises:

a first biasing diode connected to receive the input voltage; and a first capacitor connected in series with said biasing diode wherein said first capacitor charges when said first biasing diode is forward biased.

8. A turn-on transient overcurrent response suppressor as in claim 6, wherein said second charging circuit is connected in parallel with said first charging circuit and further comprises an RC network.

* * * * *